US008812970B2

(12) United States Patent
Alexander et al.

(10) Patent No.: US 8,812,970 B2
(45) Date of Patent: Aug. 19, 2014

(54) DYNAMIC DEVICE STATE REPRESENTATION IN A USER INTERFACE

(75) Inventors: Robin Alexander, Redmond, WA (US); Vladimir Sadovsky, Redmond, WA (US); Narasimhan Ramasubramanian, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1407 days.

(21) Appl. No.: 12/038,262

(22) Filed: Feb. 27, 2008

(65) Prior Publication Data

US 2009/0217188 A1 Aug. 27, 2009

(51) Int. Cl.
*G06F 3/048* (2013.01)
*G06F 3/0481* (2013.01)

(52) U.S. Cl.
CPC .................................. *G06F 3/04817* (2013.01)
USPC .......................................... 715/771; 715/772

(58) Field of Classification Search
USPC ......................................... 715/771, 772, 763
See application file for complete search history.

(56) References Cited

U.S. PATENT DOCUMENTS

| | | | |
|---|---|---|---|
| 6,003,135 A | 12/1999 | Bialick et al. | |
| 6,031,532 A * | 2/2000 | Gourdol et al. | 715/837 |
| 6,041,175 A | 3/2000 | Fukada et al. | |
| 6,121,967 A * | 9/2000 | Foster et al. | 715/772 |
| 6,190,257 B1 | 2/2001 | Takeda et al. | |
| 6,362,841 B1 | 3/2002 | Nykänen | |
| 6,366,985 B1 * | 4/2002 | Beyerlein et al. | 711/147 |
| 6,484,219 B1 | 11/2002 | Dunn et al. | |
| 6,832,273 B2 | 12/2004 | Ray et al. | |
| 6,865,717 B2 * | 3/2005 | Wright | 715/772 |
| 7,093,031 B2 | 8/2006 | Ray et al. | |
| 7,127,678 B2 * | 10/2006 | Bhesania et al. | 715/744 |
| 7,137,074 B1 * | 11/2006 | Newton et al. | 715/835 |
| 7,349,000 B2 * | 3/2008 | McDonald et al. | 715/719 |
| 7,441,200 B2 * | 10/2008 | Savage | 715/762 |
| 7,519,909 B2 * | 4/2009 | Kuiawa et al. | 715/736 |

(Continued)

FOREIGN PATENT DOCUMENTS

WO WO 95/04328 A1 2/1995

OTHER PUBLICATIONS

Secure Pen Drive User Manual, http://download.tulip.com/support/Conceptronic/USB%20Products/CSP64-512U2/UsbDiskPro.PDF.

(Continued)

*Primary Examiner* — William Titcomb
(74) *Attorney, Agent, or Firm* — John Jardine; Andrew Sanders; Micky Minhas

(57) ABSTRACT

Processes for presenting a current state of a device having device storage connected with a host system are provided. In some processes, device manufacturers or vendors define a set of operational states of a device and provide user interface (UI) elements of a custom representation of each state through information stored in the device storage. Initially, the set of states of the device and UI elements associated with each state are received from the device storage. Information regarding a current state is received from the device, and a representation of the current state, which includes the received UI elements, is presented on the host system. In other processes, UI elements of a representation of each state are obtained from a remote system using device identification information. In other processes, UI elements from the device, from the host system, and/or from a remote system are combined to form a state representation.

20 Claims, 6 Drawing Sheets

(56) References Cited

U.S. PATENT DOCUMENTS

| | | | |
|---|---|---|---|
| 7,523,408 B2 * | 4/2009 | Barrios et al. | 715/772 |
| 7,536,653 B2 * | 5/2009 | Badovinac et al. | 715/810 |
| 7,590,767 B2 * | 9/2009 | Fujita et al. | 710/8 |
| 7,613,737 B2 * | 11/2009 | Ozaki | 1/1 |
| 7,660,921 B2 * | 2/2010 | Schenk | 710/62 |
| 7,698,480 B2 * | 4/2010 | Bychkov et al. | 710/36 |
| 7,716,600 B2 * | 5/2010 | Sawano | 715/813 |
| 7,716,641 B2 * | 5/2010 | McHugh et al. | 717/124 |
| 7,729,886 B2 * | 6/2010 | Sherrill et al. | 702/188 |
| 7,818,715 B2 * | 10/2010 | Kodosky et al. | 717/109 |
| 7,925,985 B2 * | 4/2011 | Moore | 715/772 |
| 7,958,454 B2 * | 6/2011 | Gaudette | 715/763 |
| 8,146,008 B2 * | 3/2012 | Takahashi et al. | 715/763 |
| 2002/0057269 A1 * | 5/2002 | Barber et al. | 345/418 |
| 2002/0059421 A1 * | 5/2002 | Hendren, III | 709/224 |
| 2003/0184573 A1 | 10/2003 | Watanabe | |
| 2005/0125357 A1 | 6/2005 | Saadata et al. | |
| 2005/0211788 A1 * | 9/2005 | Drabczuk et al. | 235/492 |
| 2006/0039256 A1 | 2/2006 | Nakamura et al. | |
| 2006/0101005 A1 * | 5/2006 | Yang et al. | 707/3 |
| 2006/0118619 A1 | 6/2006 | Hulst et al. | |
| 2006/0179118 A1 * | 8/2006 | Stirbu | 709/217 |
| 2006/0200773 A1 * | 9/2006 | Nocera et al. | 715/764 |
| 2007/0067373 A1 * | 3/2007 | Higgins et al. | 707/206 |
| 2007/0079010 A1 * | 4/2007 | Heredia et al. | 709/246 |
| 2007/0240051 A1 * | 10/2007 | Sherrill et al. | 715/700 |
| 2007/0266194 A1 * | 11/2007 | Hahn et al. | 710/302 |
| 2007/0300188 A1 * | 12/2007 | Kim | 715/835 |
| 2008/0005697 A1 * | 1/2008 | Jung | 715/825 |
| 2008/0046806 A1 * | 2/2008 | Reddy et al. | 715/221 |
| 2008/0085102 A1 * | 4/2008 | Alm et al. | 386/125 |
| 2008/0092069 A1 * | 4/2008 | Chan et al. | 715/763 |
| 2008/0250476 A1 * | 10/2008 | Myers et al. | 726/4 |
| 2008/0263470 A1 * | 10/2008 | Murman et al. | 715/772 |
| 2008/0276170 A1 * | 11/2008 | Bonansea et al. | 715/708 |
| 2009/0217169 A1 * | 8/2009 | Takahashi et al. | 715/733 |
| 2012/0066632 A1 * | 3/2012 | Sundermeyer et al. | 715/771 |
| 2012/0151392 A1 * | 6/2012 | Takahashi et al. | 715/764 |

OTHER PUBLICATIONS

USB Flash Drive User's Manual, http://www.smmdirect.com/downloads/Drive_Users_Manual_V4-EN.doc.

How to use the Seagate Toolkit software, http://www.seagate.com/support/disc/manuals/external/pocket/Toolkit-HotToUse.htm.

DataTraveler Secure—Privacy Edition, http://www.kingston.com/support/USBFLASHDRIVES/pdf/DTSecure_Privacy_Users_manual_A03.pdf.

* cited by examiner

DYNAMIC DEVICE STATE REPRESENTATION IN A USER INTERFACE

BACKGROUND

Many different types of devices having storage, such as flash drives, digital cameras, digital media players, etc. communicate with a host system, such as a personal computer. A vendor or a manufacturer of such a device (referred to as a device provider herein) often provides a customized representation of the device for a user interface. A representation of the device for a user interface may be a graphical representation, a textual representation, a sound, etc. For example, a device provider may provide a custom icon, to be presented through the graphical user interface of the host system. A representation of the device, such as a custom icon, may change to indicate a change in a state of the device, or different representations may be used to indicate different states of the device. Frequently, one or more custom icons representing the device are included in a device-specific device driver, device-specific utility or other device-specific program supplied by the device provider. For the host system to use the custom icon(s), the host system must have the device-specific driver, utility or application installed.

Some devices having storage are commonly used with several different host systems, requiring that a device-specific driver, utility or application supplied by the device provider be installed on each host system with which the device is used. Due to the increasing popularity and increasing variety of devices having storage, including flash drives, digital cameras and media players, often multiple different devices having storage may be used with a single host system, necessitating that a device-specific driver, utility or application for each different device be installed on each host system. The installation of so many different device-specific drivers or utilities from different device providers on each host system is cumbersome and inefficient.

Some device providers avoid the use of "standard" device drivers, such as those provided through an operating system, in part, because standard device drivers do not allow a vendor or manufacturer of the device to customize the user experience through custom icons associated with the device.

SUMMARY OF INVENTION

Applicants have appreciated that if device providers could customize the user experience through custom device representations, such as custom icons, that are not included in device-specific drivers or utilities, the device providers may increasingly use standard device drivers, such as those included in an operating system, which may increase the portability of devices for different host systems and decrease the number of additional device provider supplied drivers that must be installed on any one host system. Each device representation includes one or more user interface elements that include, but are not limited to, graphical elements, acoustic/auditory elements, tactile elements, etc.

Accordingly, a process for presenting a representation of a current state of a device having device storage on a host system is provided, where a set of states of the device and a representation of each state are stored in the device storage, according to one embodiment of the invention. The process includes receiving first information from the device storage, where the first information includes the set of states of the device and a representation of each state in the set. The process also includes receiving second information from the device storage, where the second information includes an identification of a current state of the device, and presenting a representation of the identified current state of the device through a user interface of the host system. Device providers may define a set of states of the device and a custom representation of each state (such as a custom icon, a string, a sound, etc.), then supply the set of states and the custom state representations by storing them in the device storage. The states and the custom state representations may be stored on block storage of the device, which may be accessed from the host system through the file system, and/or internal storage of the device, which may be accessed from the host system using commands. Custom state representations may be reported as files stored on the device or may be reported as properties of the device, as the invention is not limited in this regard.

In some embodiments, the process includes querying the device storage for a set of device states before receiving the first information from the device storage. In some embodiments, the process includes querying the device for a current state of the device before receiving second information from the device.

In some embodiments, the process also includes receiving information regarding an updated device state from the device and presenting a representation of the updated state through the user interface of the host system. The user interface may include a graphical user interface, an auditory/acoustic user interface and/or a tactile user interface. A representation of the current state of the device may be dynamically updated by repeating the steps of: receiving information regarding an updated device state from the device, and presenting a representation of the updated state through the user interface of the host system. In some embodiments, the information regarding an updated state of the device may be received asynchronously from the device. In other embodiments, the information regarding an updated state of the device may be received in response to a poll of the device for a current device state.

A process for presenting a representation of a current state of a device having device storage using a host system and a remote service is provided, in accordance with another embodiment. The process includes receiving device identification information from the device storage. The process also includes requesting a set of states and an identification of one or more user interface (UI) elements associated with each state from a remote system based on the device identification information. The process further includes receiving information identifying a current state of the device from the device and presenting a representation of the identified current state of the device through a user interface of the host system.

A process for obtaining state representations of states of a device having device storage that is connected to a host system, which has a database of state representations, is provided, according to a different embodiment. The process includes querying the device storage for a set of states and a representation of each state in the set, where a representation of each state includes one or more UI elements, which may be graphical, textual, auditory, etc., associated with each state. If the device does not return a representation for each state in the set of states, the database of state representations on the host system is searched for a representation of each state in a first subset of states, where the first subset of states includes states for which the device did not return a representation. If a representation is not found for each state in the first subset of states, a request is submitting to a remote service for a representation of each state in a second subset of states, where the second subset of states includes states in the first subset for which a representation was not found in the database of state representations of the host system.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
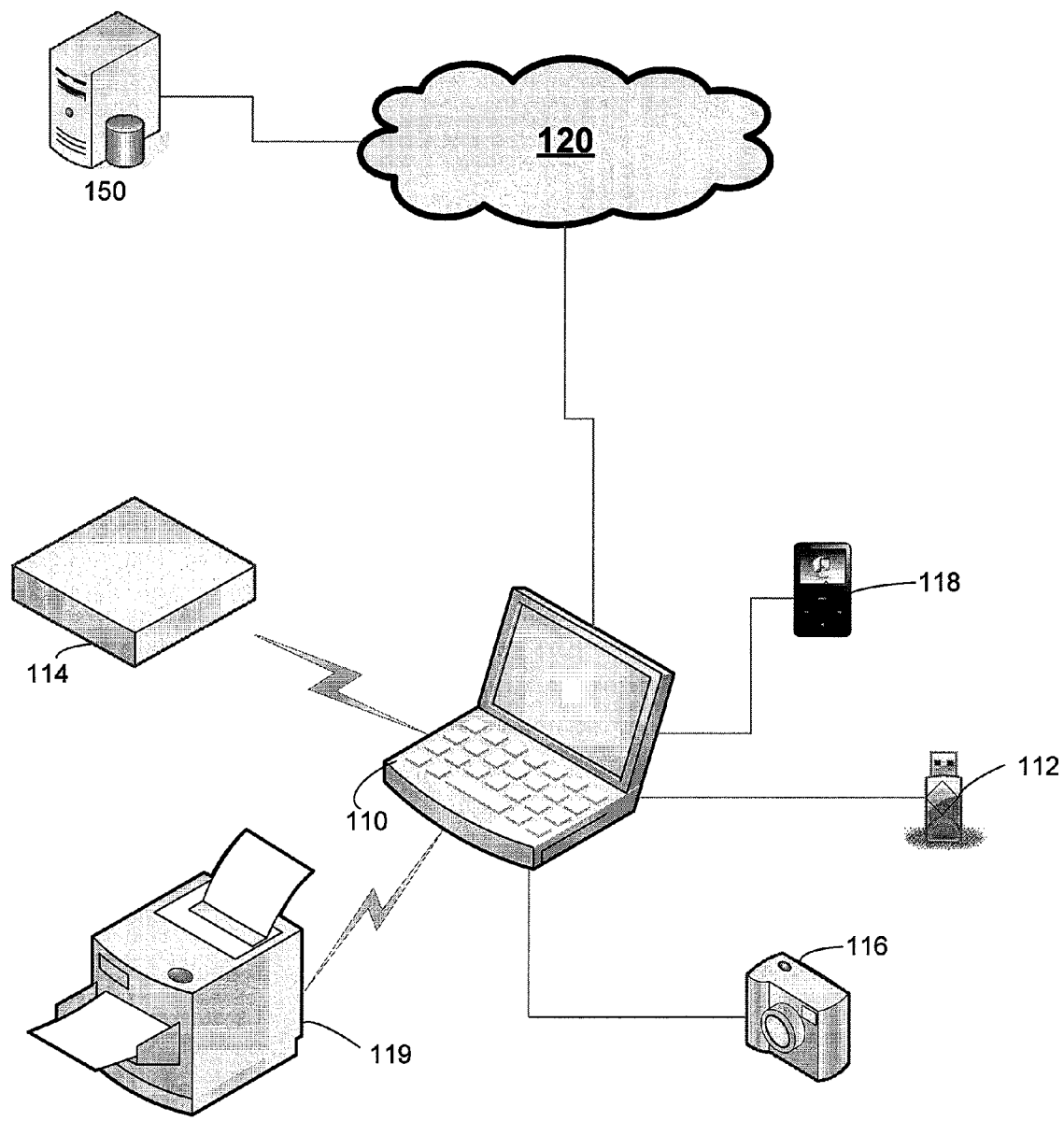
FIG. 1 is a sketch of an environment for implementation of embodiments of the current invention including a host system, a device having storage and a remote service.

Embodiments of the invention provide a process for presenting a current state of a device having device storage connected with a host system. In embodiments of the invention, device manufacturers or vendors (referred to as "device providers" herein) may specify states of a device and one or more user interface (UI) elements (e.g. graphical elements, auditory elements, etc.) associated with each state through information stored on the device. A host system may dynamically present one or more interface elements associated with a current state of the device to a user without requiring that device-specific drivers or utilities from device providers be installed on the host system.

The one or more UI elements associated with a state of a device are elements of a representation of the state, also referred to as a state representation. A representation of the state includes the one or more UI elements associated with a state of a device, and may also include information regarding how to combine the one or more UI elements. In one embodiment, a state representation includes a baseline representation provided by the host operating system and one or more UI elements provided by the device that are superimposed on the baseline representation. State representations provide a user of a host system an efficient way of identifying a state of a device having storage connected with the host system. The device may be in one or more different states at a point in time. Device states include, but are not limited to: initializing, conducting internal checking (sometimes referred to as "housekeeping"), authenticated, non-authenticated (also referred to as "not authenticated"), etc. A current state of the device may affect the performance of the device and/or how the device interacts with the host system. For example, information stored in device storage may not be accessible to a host system when the device in the initializing state. The device may have slowed performance when it is conducting internal checking in a "housekeeping" state. In another example, a secure storage device must be in an authenticated state for the host system to access information stored in a protected portion of the device storage. A visual indication of a current state of the device through state representations provides the user with important information regarding the device and a state of interaction between the device and the host computer.

In one embodiment, a first set of states of the device and one or more UI elements associated with each state are obtained from an accessible portion of the device storage. An identification of a current state of the device is obtained from the device, and one or more UI elements associated with the identified current state of the storage device are presented through a user interface of the host system. In one embodiment, the UI elements are obtained from block storage of the storage device. In another embodiment, the UI elements are obtained from internal storage of the storage device using protocol commands.

In another embodiment, device identification information is obtained from an accessible portion of the device storage. A request for a set of states and one or more UI elements associated with each state for the identified device is submitted to a remote service.

In yet another embodiment, the device storage is queried for a set of device states and a one or more UI elements associated with each state. The one or more UI elements associated with a state are included in a representation of the state. In this embodiment, the operating system includes a database of states for various devices and a representation of each state. If the device fails to provide a representation for each state in the set, then the database of states is searched to obtain representations for each state in the set of device states for which a representation has not been obtained. If representations are not obtained for each of the states in the set of states, then a request for representations of each state for which a representation has not been obtained is submitted to a remote service.

Turning now to the figures, an example environment for implementation of embodiments of the invention is depicted in FIG. 1. Various devices having storage and intelligence, such as a flash drive 112, an external hard drive 114, a digital camera 116, a media player 118 and a printer 119, are shown connected with a host system 110. Devices having storage and intelligence include devices peripheral to the host system, for example, flash drive 112, external hard drive 114, digital camera 116 and media player 118, and include devices internal to the host system, such as an internal hard drive, an internal optical drive, etc. Embodiments of the invention can be implemented using devices that include, but are not limited to: external hard drives 114, internal hard drives, optical drives, flash drives 112, digital cameras 116, media players 118, printers, etc. Other devices may be employed, as the present invention is not limited in this regard.

The host system, which communicates with one or more devices having storage, may be a computer 110, a television, a game console, a kiosk or any device or system having suitable processing capabilities, an operating system and a user interface, as the invention is not limited in this regard. The host system 110 may be wirelessly connected with a device having storage or the host system 110 may have a "wired" connection with the device.

In some embodiments the host system 110 may communicate with a remote service 150 through a network 120. The network may be the Internet, an intranet or other network suitable to connect the host system 110 with the remote service 150. The remote service 150 may provide sets of states for various devices and/or representations of states for various devices. In some embodiments, the remote service 150 may provide information regarding how to form the representations of states from one or more UI elements stored on the host system instead of directly providing the one or more UI elements included in each representation. In some embodiments, the remote service 150 may provide one or more UI elements that are combined with default UI elements stored in the host system 110 to form state representations. The remote service 150 may have a database of sets of states for various devices and/or representations of states for various devices. Sets of states, representations of states, and/or UI elements of representations of states for a device may be supplied to the remote service 150 by a device provider, a provider of an operating system, a provider of third party software to be used with the device, or another party interested in customizing representations of states of a device, as the invention is not limited in this regard.

Figure 2:
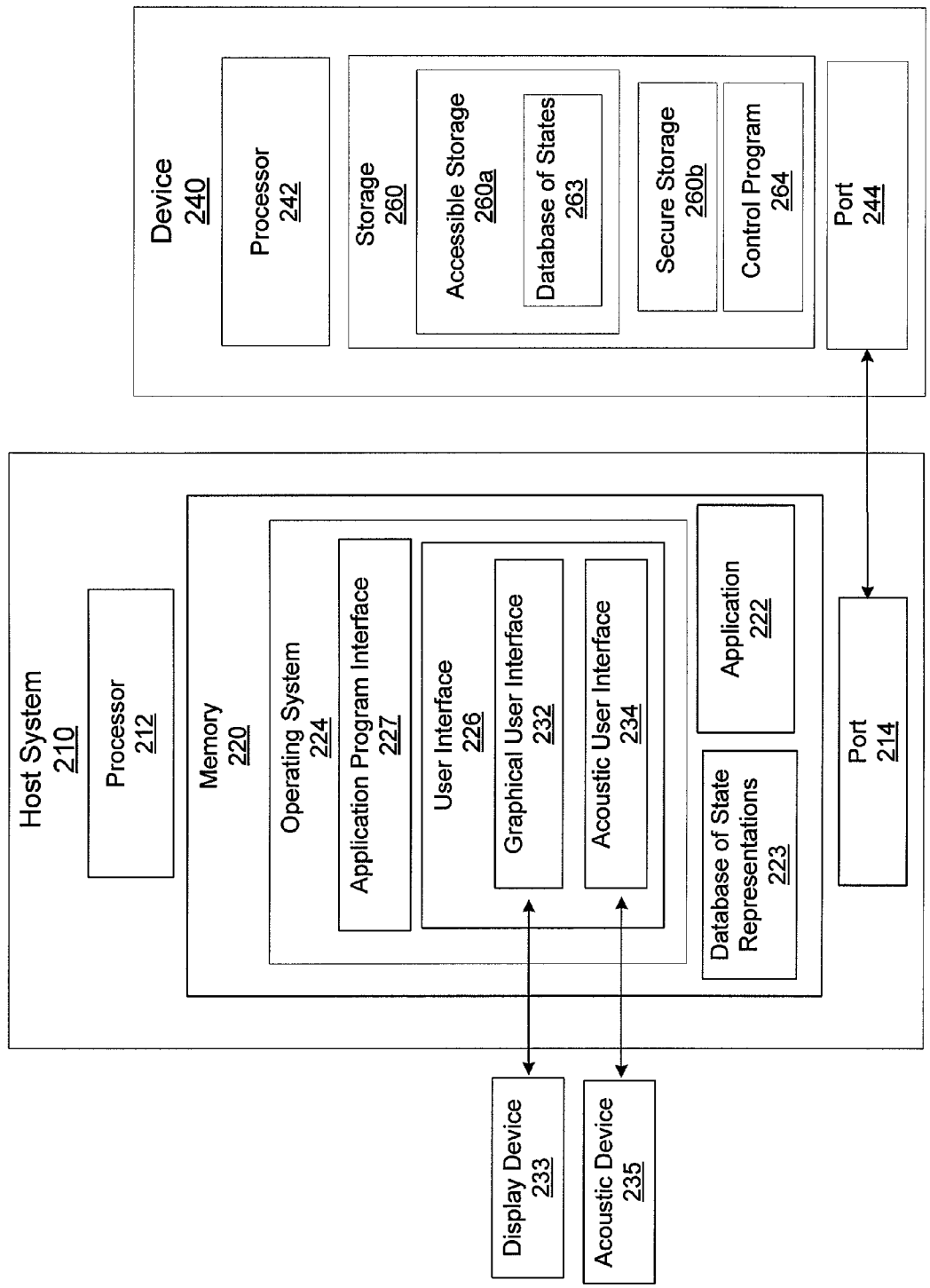
FIG. 2 is a block diagram of components of the host system and the device, according to an embodiment of the invention.

FIG. 2 illustrates components of a host system 210 and a device 240 having storage and intelligence for implementing embodiments of the invention. The host system 210 includes a processor 212 and memory 220. The host system 210 also includes an operating system 224 that is executed by the processor 212. In some embodiments, the operating system 224 may be the Microsoft® Windows® Vista™ operating system, though other suitable operating systems may be employed, as the present invention is not limited in this respect. The operating system 224 includes a user interface 226. The user interface may include a graphical user interface (GUI) 232 for displaying information on a display device 233 and/or may include an acoustic user interface 234 for producing sound with an acoustic device 235, such as a speaker, etc. The host system also includes a port 214 for communicating with the device 240 having storage and intelligence.

The host system 210 may include an application 222 that is executed on the processor 212 and supported by the operating system 224. In some embodiments, the operating system includes an application program interface API 227 that allows the application to obtain information regarding a current state of the device and allows the application to present a state representation of the current state of the device in a user interface of the application 222.

In some embodiments, the host system 210 includes a database of representations of states of devices 223. The database 223 may include states of various devices and corresponding representations of each state. Additionally, the database may include device identification information and sets of states corresponding to each identified device.

Device 240 includes non-volatile storage 260, a control program 264, a processor for execution of the control program 242, and a port 244 for communication with the host system 210. The non-volatile storage 260 may include non-volatile memory, hard disk space or storage using another suitable storage medium. In some embodiments, storage 260 includes block storage, which may accessible to the host system 210 through a file system, and internal storage, which may only accessible to the host system 210 through commands. In some embodiments, the storage may include an accessible storage portion 260a and a secure storage portion 260b. The accessible storage portion 260a may include an accessible storage portion of the block storage and/or an accessible storage portion of the internal storage. The secure storage portion may include a secure storage portion 260b of the block storage and/or a secure storage portion 260 of the internal storage. For example, a secured transient storage device may include an accessible storage portion 260a, which the host system is permitted to access in both an authenticated device state and in a non-authenticated device state, and include a secure storage portion 260b, which the host system is permitted to access only when the device is in an authenticated state. In some embodiments, the device storage 260 includes a database of states 263. The database of states 263 includes a set of states for the device 240, and may further include one or more UI elements associated with each state, a representation of each state and/or an identification of one or more UI elements that combine to form a representation of each state. Although the device 240 is shown external to the host system 110, as described above, the device 240 may a peripheral device or an internal device such as an internal hard drive.

The host system 210 and the device 240 may be connected through any suitable ports 214, 244 and communicate using any suitable communication protocols. For example, the host system 210 and the device 240 may communicate through a Universal Serial Bus (USB) using the common standard extensible protocol IEEE 1667, according to an embodiment of the invention. In other embodiments, the host system 210 and the device 240 may communicate via any suitable bus type using any suitable associated protocols including, but not limited to: Parallel Advanced Technology Attachment (PATA), Integrated Drive Electronics (IDE), enhanced IDE (EIDE), Serial Advanced Technology Attachment (SATA), Small Computer System Interface (SCSI), Serial Attached SCSI (SAS), Fibre Channel Protocol (FCP), and IEEE 1394 high speed serial bus, as the present invention is not limited in this regard.

Figure 3:
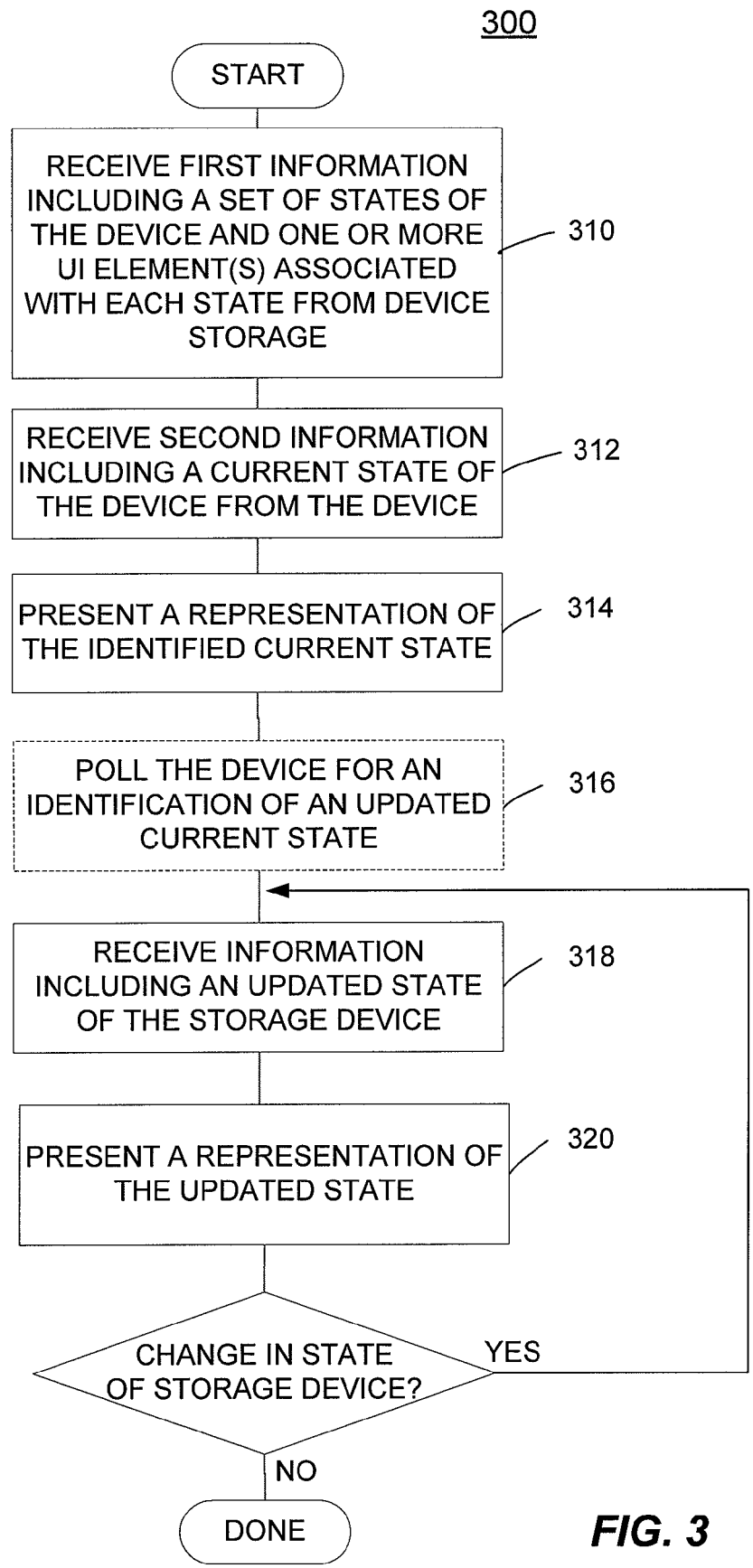
FIG. 3 is a flowchart of a process for presenting a representation of a current state of a device having device storage that includes receiving a set of states of the device and receiving one or more UI elements associated with each state in the set, according to an embodiment of the invention.

FIG. 3 depicts a process 300 for presenting a current state of a device having device storage using a host system that includes receiving a set of states from the device and receiving an identification of one or more UI elements associated with each state from the device. Process 300 will be described with respect to the host system 210 and the device 240 depicted in FIG. 2, though other systems and devices may be used, as the present invention is not limited in this regard.

In some embodiments, process 300 may be initiated when the host system 210 discovers or detects that the device 240 is connected to the host system 210, when the host system 210 is powered on, when the device 240 is powered on, when a user of the host system 210 attempts to access information stored in the device 240 or by the occurrence of any other suitable initiating event. Initially, first information is received from device storage 260 (step 310). The first information includes a set of states of the device 240. The first information also includes one or more UI elements associated with each state in the set of states. As described above, a representation of a state includes the one or more UI elements associated with the state. The first information received from device storage 260 may include the one or more UI elements themselves. In some embodiments, the first information may include information identifying one or more UI elements stored in the host system that are combined to form the representation, or the first information may include at least one UI element from the device storage and information identifying at least one UI element stored in the host system that are combined to form the representation. In some embodiments of the invention, the first information is provided by the device 240 in response to a query from the host system 210, though the information can be provided automatically upon a designated event.

In some embodiments, the device 240 has block storage, which may be accessed by the host system 210 through the file system, and internal storage, which may be accessed by the host system using commands. For devices 240 having block storage and internal storage, the first information may be stored as a file in the block storage and/or stored in the internal storage (e.g. as a "device property").

In one embodiment, the device 240 includes a partition in block storage, which is read by default. The partition contains files holding UI elements, e.g. image files or sound files, and/or a file specifying a set of states. The files holding UI elements and/or the file specifying a set of state may be read by the host system 210 through the file system.

In another embodiment, the device 240 includes an applet or silo, which will be named "StateRepsSilo" simply for descriptive purposes. The host system 210 includes a complementary "StateReps" control module, e.g. a driver, for communicating with the "StateRepsSilo." After the StateReps control module of the host system 210 binds to the protocol, the host system 210 issues a command and receives information representing UI elements of state representations from the internal storage of the device in response to the command.

For devices having an accessible storage 260a and secure storage 260b, storing the first information in the secure storage 260b would prevent access to the set of device states and may prevent access to the one or more UI elements associated with each state until the device is authenticated. Accordingly, in devices having accessible storage 260a and secure storage 260b, the first information may be stored in the accessible storage 260b.

As described above, states that may be included in the set of states include, but are not limited to: initializing, conducting internal checking ("housekeeping"), authenticated, non-authenticated (e.g. locked, permanently locked), etc. States included in the set of states may be standard states, known states, or "custom" states and "new states" defined by the device provider. States included in the "set of states" for the device may be selected by the device provider.

In some embodiments, an identification of one or more UI elements associated with each state may include an identification of one or more UI elements (e.g. an icon or a portion of an icon) stored on the device. The one or more UI elements associated with each state may be stored on the device in the form of an image file in an image file format. In some embodiments, an identification of the one or more UI elements associated with each state may include an identification of one or more UI elements provided by the operating system of the host system.

In other embodiments, an identification of one or more UI elements associated with each state may include an identification of one or more UI elements stored on the device and one or more UI elements included in the operating system of the host system. In some embodiments, a state representation of a device state is a combination of the one or more UI elements and the first information may include information regarding how to combine the one or more UI elements associated with the state to form the state representation.

Second information is then received from the storage device, the second information including an identification of a current state of the device (step 312). In some embodiments, the second information is received from the device 240 in response to a query of the current device state; however, the present invention is not limited in this regard.

A representation of the identified current state of the device 240 is presented through the user interface of the host system 210 (step 314). As described above, the one or more UI elements associated with the identified current state of the device 240 may be received from the device storage, may be obtained from storage of the host system 210, or both. In one embodiment, presenting a representation of the identified current device state may include displaying an icon representing the current state of the device 240 through the graphical user interface 232 of the host system 210. In another embodiment, presenting a representation of the identified current device state may include producing sound representing the current state of the device through the acoustic user interface 234.

In some embodiments, presenting a representation of a current device state includes presenting one or more UI elements that are transformed to form a composite element. The composite element may be formed of one or more UI elements obtained from the device 240 and/or one or more UI elements obtained from the host system 210. In one embodiment, one or more UI elements overlay one or more other UI elements to form a composite state representation.

Figure 4C:
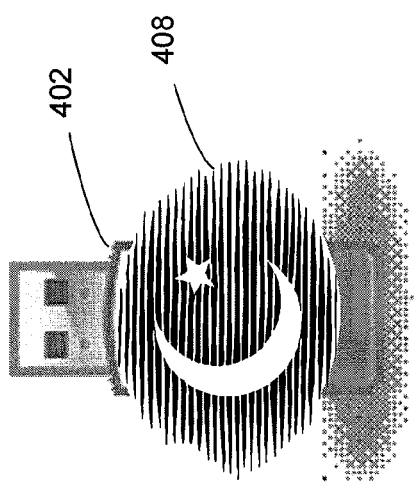
FIG. 4C is a sketch of a representation of an inactive state of the transient storage device, according to an embodiment of the invention.
Figure 4B:
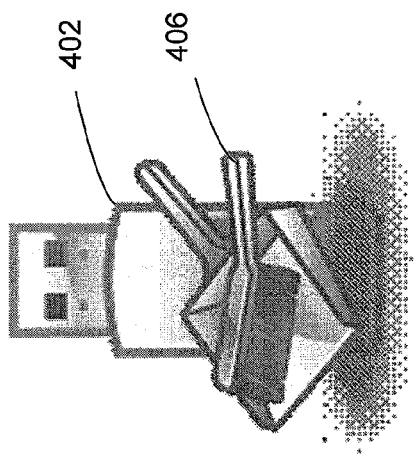
FIG. 4B is a sketch of a representation of an internal checking state of the transient storage device, according to an embodiment of the invention.
Figure 4A:
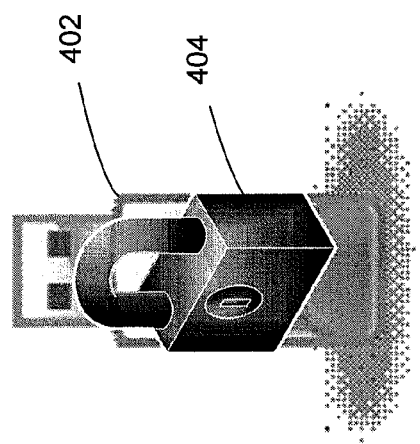
FIG. 4A is a sketch of a representation of a non-authenticated state of a transient storage device, according to an embodiment of the invention.

FIG. 4A shows a representation of a non-authenticated state of a secure storage device that includes an image of a lock 404 overlaying a secure storage device icon 402. FIG. 4B shows a representation of an internal checking ("housekeeping") state of a secure storage device that includes an image of a broom and dustpan 406 overlaying the secure storage device icon 402. FIG. 4C shows a representation of an inactive state of a secure storage device that includes an image of a moon and a star 408 overlaying the secure storage device icon 402.

In another embodiment, a vendor may provide a custom UI element which overlays a standard operating system UI element to form a composite state representation. Transforms used to form the composite state representation include transforms to overlay the custom UI element and transforms to adjust a transparency level of the custom UI element and/or the standard UI element. One or more custom UI elements and one or more standard UI element may be superimposed using any known method, e.g. alpha compositing for graphical elements.

Transforms applied to UI elements to form a composite state representation are not limited to transforms that overlay two elements. As used herein, a transform is a bit manipulation of format change that combines different distinct elements into a composited element. If the one or more interface elements are all 2D bitmaps then the transforms are 2D graphic transforms. Mask transforms may be applied. More complex transforms to create 3D effects may be applied. Different states of a device may be indicated by different transforms applied to the interface elements, for example, a hue of the composite transform or a size of the composite transform may differ for an authenticated and for a non-authenticated state.

In one embodiment, the host system 210 includes a database of "default" or "baseline" state representations 223. Each composite state representation 223 may be a superposition of a baseline state representation from the host system 210 database and one or more UI elements received from the device storage 260.

Returning to the flow diagram of process 300 depicted in FIG. 3, a representation of the state of the device may be dynamically updated based on changes in the device state. Information including an updated state of the storage device may be received (step 318) and a representation of the updated state of the storage device may be presented (320). The host system 210 may dynamically represent the current device state by repeating the steps of receiving information including an updated state of the device (step 318) and presenting a representation of the updated state of the storage device (step 320). In some embodiments the host system 210 may poll the device 240 for the current device state at selected times, at selected intervals of time or when triggered by a triggering event. In other embodiments, the updated state of the device may be received asynchronously from the device.

Figure 5:
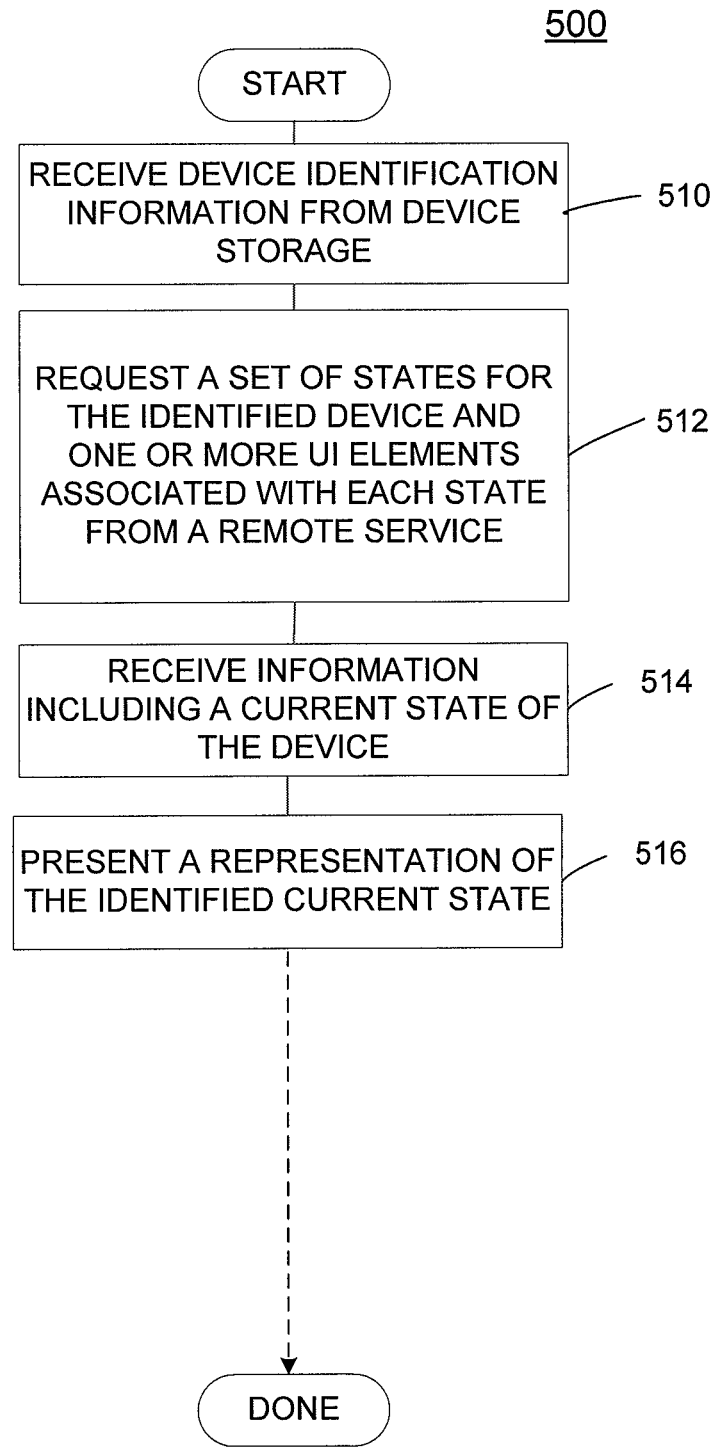
FIG. 5 is a flowchart of a process for presenting a representation of a current state of a device that includes receiving device identifying information from the device and submitting a request for a set of states and a representation for each state in the set to a remote service based on the obtained device identifying information, according to another embodiment of the invention.

FIG. 5 is a flow chart depicting a process 500 for presenting a representation of a current state of a device that includes receiving device identifying information from the device, and requesting a set of states and information identifying one or more UI elements associated with each state from a remote system, according to another embodiment of the invention. In process 500, device identification information is obtained (step 510). A request for a set of states for the identified device and one or more UI elements associated with each state is sent to a remote service (step 512). Information regarding a current state of the device is received from the device (step 514). After the set of states, the one or more UI elements associated with each state, and information regarding the current state of the device are obtained, a representation of the current state of the device is presented (step 516), where a representation of the current state comprises the one or more UI elements associated with the current state. Presenting a representation of the updated state may occur as described with respect to process 300 and FIG. 3.

Figure 6:
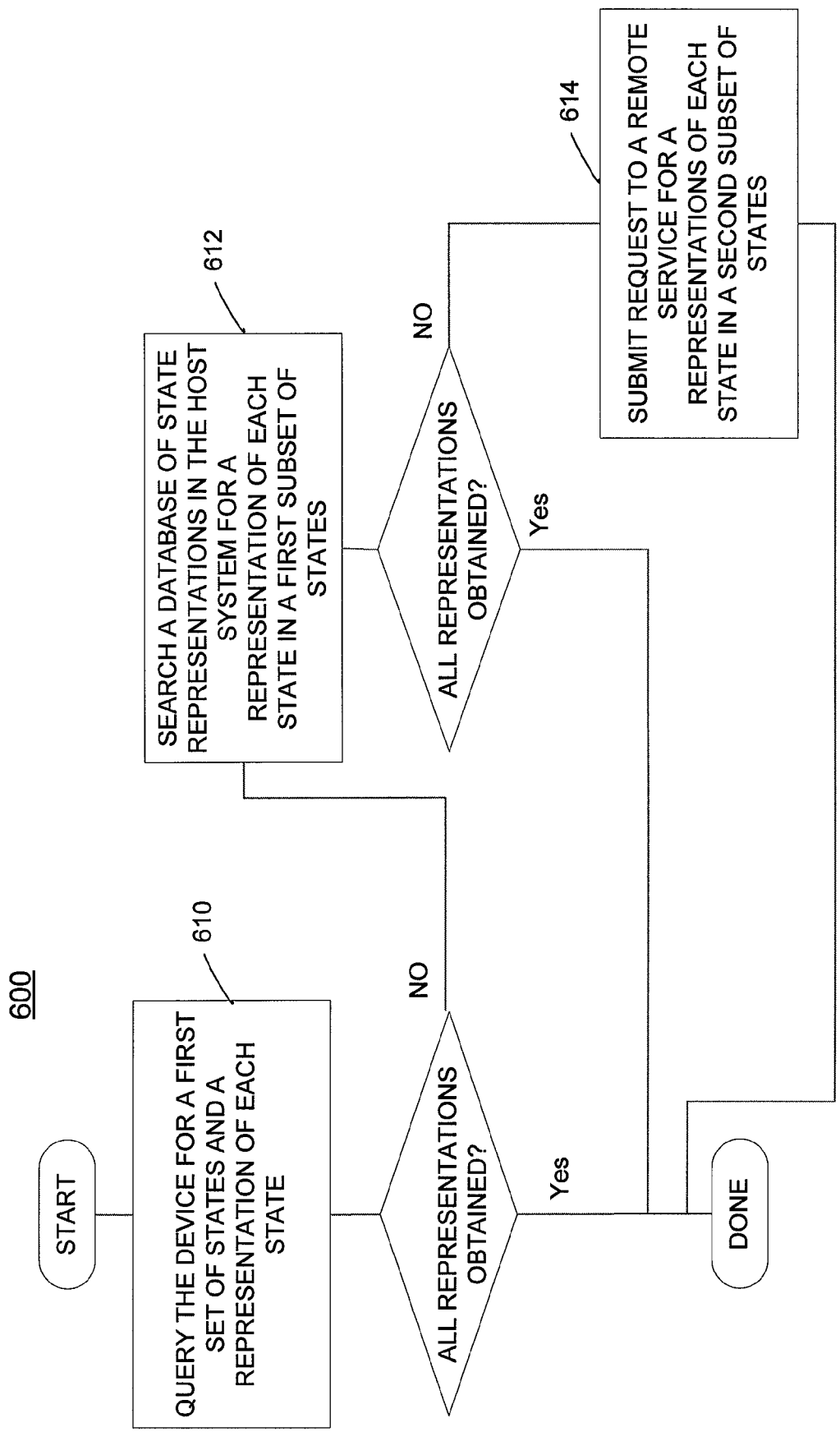
FIG. 6 is a flowchart of a process for obtaining representations of states of a device having storage, according to another embodiment of the invention.

FIG. 6 is a flow chart of a process 600 for obtaining representations of states of a device having device storage connected with a host system having a database of state representations and using a remote service, according to another embodiment of the invention. Initially, the device storage 260 is queried for a set of states and a representation of each state in the set of states (step 610). As described above, the device storage 260 may hold a database of states 263 that includes a set of states for the device and may include a representation for each state in the set of states, one or more elements associated with each state in the set of states or an identification of one or more elements that form a representation of each state. If the device 240 does not return a representation for all the states in the set of states, a database of state representations 223 on the host system is searched for a representation of each state in a first subset of states (step 612), where the first subset of states includes all the states for which the device did not return a representation. As described above, the host system 210 may have a database of state representations 223 that may be included with the operating system 224 of the host system 210. If a representation is not found for every state in the subset of states, then a request is submitted to a remote service for representations of each state in a second subset of states (step 614), where the second subset of states includes the states in the first subset of states for which a representation was not found.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

In addition, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

In addition, the various methods or processes outlined herein may be coded as software that is executable on one or more processors that employ any one of a variety of operating systems or platforms. Additionally, such software may be written using any of a number of suitable programming languages and/or programming or scripting tools, and may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for presenting a representation of a current state of a device having device storage, the method comprising:
    receiving, from the device, identifications of a plurality of states from a set of possible states for the device, and identifications of one or more user interface elements associated with each of the plurality of states from the set of possible states;
    receiving, from the device, an identification of a current state of the device, the current state being one of the plurality of states; and
    presenting a representation of the current state of the device through a user interface of a host system without use of a device-specific driver or application, the presentation of the representation of the current state comprising:
        presenting, based on the received identifications of the plurality of states and based on the received identification of the current state of the device, the one or more user interface elements associated with the current state; and
        presenting, based on the received identification of the current state of the device, and in conjunction with the presentation of the one or more user interface elements associated with the current state, an additional user interface element from a database on the host system, wherein the one or more user interface elements associated with the current state and the additional user interface element from the database on the host system represent a state of interaction between the device and the host system.

2. The method of claim 1, further comprising:
    querying the device for the set of possible states.

3. The method of claim 1, wherein the representation of the current state of the device comprises a superposition of the additional user interface element from the database on the host system and the one or more user interface elements associated with the current state.

4. The method of claim 1, further comprising:
    receiving information regarding a change to the current state of the device; and
    presenting a representation of the changed current state through the user interface.

5. The method of claim 4, wherein the information regarding the change to the current state of the device is received asynchronously from the device.

6. The method of claim 4, wherein:
    the method further comprises polling the device for the change to the current state of the device; and
    the information regarding the change to the current state of the device is received in response to the polling.

7. The method of claim 4, further comprising:
    receiving, from an application through an application programming interface, a request for information relating to the current state of the device; and
    in response to the request, polling the device for device status.

8. The method of claim 1, wherein the device is a Universal Serial Bus (USB) compatible device.

9. The method of claim 1, wherein the identifications of the plurality of states and the identifications of the one or more user interface elements are communicated in the IEEE 1667 protocol.

10. The method of claim 1, wherein the device is a secure storage device.

11. A computer-readable memory having instructions stored therein which when executed on a host computing device, perform operations for representing a current state of a peripheral device, the operations comprising:
    receiving, from the peripheral device, identifications of each of a plurality of possible states of the peripheral device and identifications of one or more user interface elements associated with each of the plurality of possible states of the peripheral device;
    receiving, from the peripheral device, an identification of a current state of the peripheral device, the current state being one of the plurality of states of the peripheral device; and
    presenting a representation of the current state of the peripheral device through a user interface of a host computing device, the presentation of the representation of the current state comprising:
        presenting, based on the received identifications of the plurality of possible states of the peripheral device and based on the received identification of the current state of the peripheral device, the one or more user interface elements associated with the current state of the peripheral device; and
        presenting, based on the received identification of the current state of the peripheral device, and in conjunction with the presentation of the one or more user interface elements associated with the current state of the peripheral device, an additional user interface element from a database on the host computing device, wherein the one or more user interface elements associated with the current state of the peripheral device and the additional user interface element from the database on the host computing device illustrate an interaction between the peripheral device and the host computing device.

12. The computer-readable memory of claim 11, wherein the representation of the current state of the peripheral device is a superimposition of the additional user interface element from the database on the host computing device and the one or more user interface elements associated with the current state of the peripheral device.

13. The computer-readable memory of claim 11, wherein the operations further comprise:
  receiving information regarding a change to the current state of the peripheral device; and
  presenting a representation of the changed current state of the peripheral device through the user interface.

14. The computer-readable memory of claim 13, wherein:
  the operations further comprise polling the peripheral device for the change to the current state of the peripheral device; and
  the information regarding the change to the current state of the peripheral device is received by the host computing device in response to the polling.

15. The computer-readable memory of claim 11, wherein the identifications of the plurality of states of the peripheral device and the identifications of the one or more user interface elements are communicated in accordance with a IEEE 1667 protocol.

16. The computer-readable memory of claim 11, wherein the peripheral device is a secure storage device.

17. A host computing device, comprising:
  a display device; and
  a memory and a processor that respectively store and execute instructions that:
    receive, from a peripheral device connected to the host computing device, identifications of each of a plurality of possible states of the peripheral device and identifications of one or more user interface elements associated with each of the plurality of possible states of the peripheral device;
    receive, from the peripheral device, an identification of a current state of the peripheral device, the current state being one of the plurality of identified states of the peripheral device; and
    present, on the display device of the host computing device, a representation of the identified current state of the peripheral device through a user interface associated with the host computing device, the presentation of the representation of the identified current state of the peripheral device comprising:
      presentation, based on the received identifications of the plurality of possible states of the peripheral device and based on the received identification of the identified current state of the peripheral device, the one or more user interface elements associated with the identified current state of the peripheral device; and
      presentation, based on the received identification of the identified current state of the peripheral device, and in conjunction with the presentation of the one or more user interface elements associated with the identified current state of the peripheral device, an additional user interface element from a database associated with the host computing device, wherein the one or more user interface elements associated with the identified current state of the peripheral device and the additional user interface element from the database associated with the host computing device represent a state of the peripheral device with respect to the host computing device.

18. The host computing device of claim 17, wherein the representation of the identified current state of the peripheral device is a superimposition of the additional user interface element from the database associated with the host computing device and the one or more user interface elements associated with the identified current state of the peripheral device.

19. The host computing device of claim 17, wherein the instructions also:
  receive information regarding a change to the current state of the peripheral device; and
  present a representation of the changed current state of the peripheral device through the user interface.

20. The host computing device of claim 19, wherein:
  the instructions also poll the peripheral device for the change to the current state of the peripheral device; and
  the information regarding the change to the current state of the peripheral device is received by the host computing device in response to polling.

* * * * *